May 14, 1963 P. DEVON 3,089,706

PHONOGRAPH RECORD HOLD DOWN

Filed May 26, 1960

INVENTOR.
PHILIP DEVON

BY Edward Halle

ATTORNEY

United States Patent Office 3,089,706
Patented May 14, 1963

3,089,706
PHONOGRAPH RECORD HOLD DOWN

Philip Devon, Roslyn, N.Y., assignor, by mesne assignments, to Educational Aids Publishing Corp., Long Island, N.Y., a corporation of New York
Filed May 26, 1960, Ser. No. 32,017
4 Claims. (Cl. 274—42)

This invention relates to a hold down for light weight phonograph records such as those made of paper, paperboard, thin light weight plastic, or a combination of any materials to produce an extremely thin light weight phonograph record. At the present time and heretofore, certain phonograph records have been made of a main body portion of heavy paperboard, plastic or similar material. The playing surface of a record with a paper or paperboard body is made by coating or laminating a plastic material on the surface. Such a plastic material should be capable of being cut or pressed for the usual reproduction on a phonograph. Such records are relatively inexpensive to manufacture and have a wide distribution as premiums, advertising promotional aids, musical postcards, personal mailing records, etc.

There are two standard types of reproducing turntables for phonographs which are commonly known as the, automatic, and the, manual. In the automatic type turntable, there is usually a long, non-rotating spindle for stacking the records and holding them until ready for play. This spindle is located at the center of the turntable and does not turn with the turntable.

In the manual type of turntable where there is no problem of stacking or holding records, since only one record is placed on at one time, the spindle is a fixed part of the turntable and revolves with it. The usual range of diameter for spindles is between 0.275 to 0.286 inch. It is usual for the spindle on the manual type turntables to be narrower in diameter and at the lower end of the range and for spindles on automatic turntables to be wider and at the higher end of the range. In addition, there are shoulders and other protuberances on the spindle of the automatic turntable which affect the diameter of the spindle and enlarge it at certain points. The problem concerning the varying size of the spindles will be readily apparent to anyone familiar with the art of manufacturing phonograph records. Specifically, the problem is this: if a record is made with a central perforation designed to have a universal fit, on both automatic and manual turntables, the diameter of the perforation must be wide or large, enough to clear the widest standard automatic turntable spindle. In such case, the record should have a perforation with diameter of no less than 0.300 inch. Such a record will fit on both types of record players.

Such a record may work well on an automatic player because the phonograph stylus or arm is relatively light and will not exert too much pressure on the record to cause it to slip and remain motionless while the turntable moves underneath it. In a manual turntable where the phonograph stylus or arm is relatively heavier than the automatic, the weight of the needle will usually cause the record to slip in this manner. This is because of the extreme light weight of the record, as well as its tendency sometimes to bend and fail to assume a perfectly flat, even relationship with the turntable.

This problem could be solved by providing such a light record with a narrower central perforation. For example, a 0.276 inch diameter which would fit quite snugly over a spindle of 0.275 inch diameter such as might be found on a manual record player. The snug fit of the record over the spindle which revolves with the turntable is desirable and necessary to keep the lighter record revolving with the turntable in spite of the weight of a relatively heavy phonograph stylus or arm and needle. However, this solution robs the record of its universal character since it would not then fit over the wider spindle of the automatic turntable. Even if it did, it would fit snugly over the non-rotating spindle which remains stationary while the turntable revolves around it. This, in and of itself would cause the record to slide badly or even remain completely motionless.

It is therefore an object of my invention to provide a phonograph record hold down which will hold a record down snugly on a manual type turntable even though the central perforation of the record is relatively wider than the diameter of the spindle of the turntable. It is a further object of my invention to provide a phonograph record with a central perforation wide enough to be adapted to slide over the standard turntable spindle, whether automatic or manual; in combination with a phonograph record hold down which may be used with the record to provide a snug fit on a manual turntable. Further objects and advantages of my invention will appear in the specification herein below and in the accompanying drawings, in which:

Similar numerals refer to similar parts throughout the several views.

Figure 1:
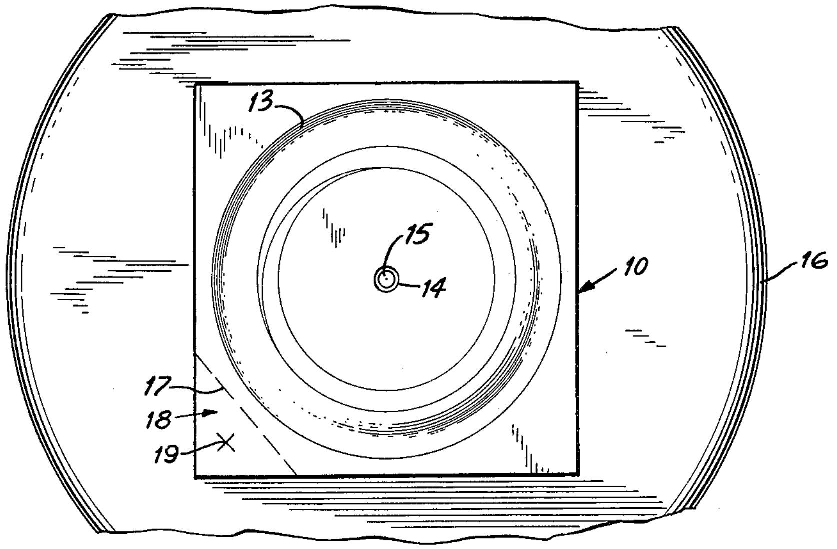
FIG. 1 is a top plan view of a combination phonograph record having a combined hold down mounted on a turntable before the hold down is physically removed from the record, with portions of the turntable cut away.
Figure 2:
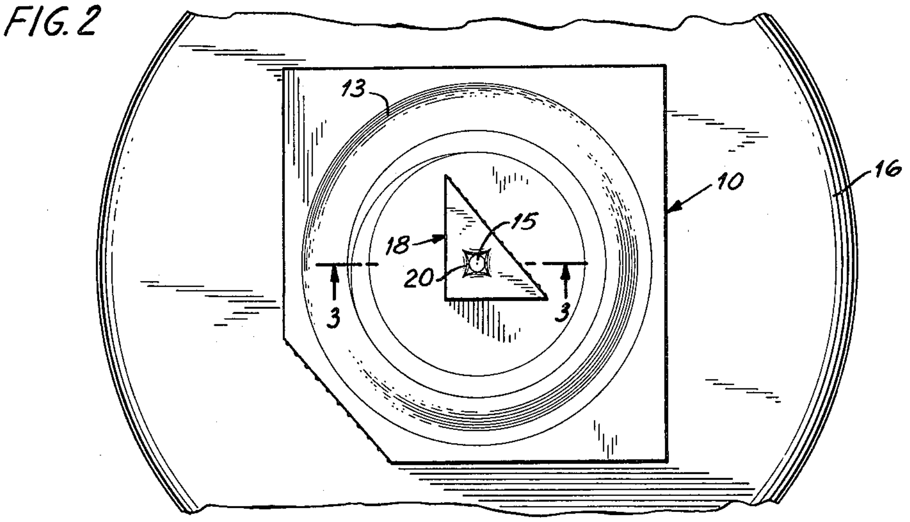
FIG. 2 is a top plan view of the record mounted on a turntable with the hold down portion removed from the record and firmly pressed down on the spindle of the turntable, with portions of the turntable cut away.
Figure 3:
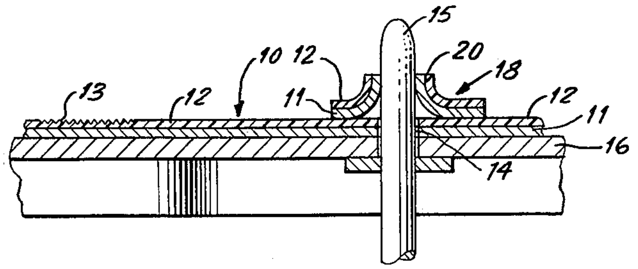
FIG. 3 is an enlarged cross section along the lines 3—3 in FIG. 2 with the thickness of the record and hold down greatly exaggerated.

In the preferred form of invention shown, the phonograph record 10 has a main body portion, preferably made of heavy paper or board 11, with a lamination or coating of plastic 12, into which the matter to be reproduced is pressed or cut in the usual manner for manufacturing phonograph records resulting in the usual types of grooves 13. A perforation 14 is centrally located in the record 10 so that it may be placed over the spindle 15 of a turntable 16.

Reference to FIG. 1 of the drawings will show that the perforation 14 is of relatively greater size than the diameter of the spindle 15. This is done so that the perforation will fit over a relatively wider automatic spindle 15 of a manual turntable which is shown in FIG. 1. In the lower left hand corner of the record 10 shown in FIG. 1 scoring 17 is provided. The purpose of the scoring 17 is to render the corner 18 easily detachable from the balance of the record 10. The corner 18 becomes a hold down, or means to grasp the spindle 15. The hold down 18 is provided with a criss-crossed scoring 19 at a relatively central portion thereof. The criss-crossed scoring 19 enables the hold down 18 to be placed over the spindle 15 with ease. When the hold down 18 is placed over the spindle 15 and the center of the criss-crossed scoring 19 is lined up with the center axis of the spindle 15 and the hold down is pressed down the spindle will push up and break through the scoring 19 and create tabs 20 from the material of the hold down 18 and protrude through the tabs 20. The pressure of the materials against the tabs 20 will cause the tabs 20 to hug the spindle 15, snugly. The further down the hold down 18 is pressed the tighter it will hold the record 10 against the turntable 16 and the spindle 15.

It is thus apparent that the record 10 shown in the drawings has a perforation 14 wide enough to fit any standard spindle and yet by use of the hold down 18 will fit snugly and securely on a turntable with a narrow spindle. Thus for example, a record with a perforation 14 having a diameter of 0.300 inch will fit on both automatic and manual turntables having spindles varying in range from 0.275 inch to 0.285 inch with ease and yet through the use of the hold down 18 will be caused to fit snugly on the narrowest spindle of the mentioned turntables.

The dimensions that are given are for purposes of illustration only. If standard turntables are to be made in different sizes from those mentioned herein, the records with perforations 14 can be made of a size accordingly larger than the largest of the spindle sizes and the hold down 18 will then compensate for the greater diameter of the record perforation 14.

Therefore, while I have described my invention in its preferred form and in the preferred dimensions, there are variations in form and in dimensions which may be made without departing from the spirit of the invention, and I therefore desire to be protected for all forms and dimensions coming within the claims below.

Wherefore, I claim:

1. A phonograph record, for use with a phonograph turntable having a centrally located spindle, comprising: a body portion provided with a perforation, and recording means around said perforation, said body portion being made of lightweight material having the properties of easy bending and separation upon being folded or scored, and having at least one first scoring means in the said material positioned between the said recording means and an edge of the said body portion, and at least one second scoring means positioned between the said recording means and the first mentioned scoring means, the said first mentioned scoring means being of a configuration so that when the material of the said body portion containing said first scoring means is subjected to pressure at the location of the configuration of said first scoring means, the said material will rupture and provide an opening sufficient to slide fit over the said spindle, and in which the configuration of the said first scoring means is completely within the area defined by the said edge of the said body portion and the said second scoring means; whereby when the material of the said body portion of the record is bent or folded along the said second mentioned scoring means, a portion of the said body portion having the first mentioned scoring means may be separated, the record may be placed on a phonograph turntable with the said perforation over the said spindle, and the said separated portion having the first mentioned scoring means may be pressed over the said spindle to rupture the first mentioned scoring means and forced down on the said spindle to hold down the said record.

2. The record as described in claim 1 in which the light weight material is a plastic.

3. The record as described in claim 1 in which the light weight material is paper with a plastic coating.

4. The record as defined in claim 1 in which the light weight material is cardboard with a plastic coating.

References Cited in the file of this patent

UNITED STATES PATENTS

| | | |
|---|---|---|
| 1,821,916 | Acheson et al. | Sept. 8, 1931 |
| 1,881,110 | Acheson et al. | Oct. 4, 1932 |
| 3,000,640 | Strauss | Sept. 19, 1961 |

FOREIGN PATENTS

| | | |
|---|---|---|
| 324,534 | Great Britain | Jan. 30, 1930 |
| 1,195,640 | France | Mar. 19, 1959 |
| 1,197,047 | France | Nov. 27, 1959 |